United States Patent
Lyon et al.

(10) Patent No.: US 9,038,611 B2
(45) Date of Patent: May 26, 2015

(54) NOX FEEDBACK FOR COMBUSTION CONTROL

(75) Inventors: Peter Mitchell Lyon, Birmingham, MI (US); Chris Riffle, Brighton, MI (US); Michiel J. Van Nieuwstadt, Ann Arbor, MI (US); Frank M. Korpics, Belleville, MI (US); Jeff Reich, Plymouth, MI (US); Dean Pennala, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 13/295,648

(22) Filed: Nov. 14, 2011

(65) Prior Publication Data

US 2013/0118461 A1    May 16, 2013

(51) Int. Cl.
| | |
|---|---|
| *F02B 47/08* | (2006.01) |
| *F02D 21/08* | (2006.01) |
| *F02M 25/07* | (2006.01) |
| *F02D 41/00* | (2006.01) |
| *F02D 41/14* | (2006.01) |
| *F02D 13/02* | (2006.01) |
| *F02B 75/12* | (2006.01) |
| *F02B 37/007* | (2006.01) |

(52) U.S. Cl.
CPC ........... *F02D 21/08* (2013.01); *F02M 25/0707* (2013.01); *F02M 25/0709* (2013.01); *F02M 25/0711* (2013.01); *F02M 25/0718* (2013.01); *F02M 25/0732* (2013.01); *F02M 25/0744* (2013.01); *F02D 13/0207* (2013.01); *F02D 13/0219* (2013.01); *F02B 2075/125* (2013.01); *F02B 37/007* (2013.01); *F02D 41/0065* (2013.01); *F02D 41/146* (2013.01); *F02D 41/1461* (2013.01); *F02D 2250/36* (2013.01); *Y02T 10/123* (2013.01); *Y02T 10/47* (2013.01)

(58) Field of Classification Search
USPC ............. 73/114.71, 114.74; 123/568.11, 681; 60/605.2, 611, 274, 276
See application file for complete search history.

(56) References Cited

U.S. PATENT DOCUMENTS

| | | | |
|---|---|---|---|
| 4,501,140 A * | 2/1985 | Nakagawa et al. ........ 73/114.42 |
| 5,787,883 A | 8/1998 | Cramer | |
| 6,928,806 B2 * | 8/2005 | Tennison et al. ................ 60/286 |
| 7,007,685 B2 * | 3/2006 | Ichihashi ....................... 123/703 |
| 7,334,573 B2 * | 2/2008 | Shiraishi et al. ......... 123/568.14 |
| 7,418,816 B2 * | 9/2008 | Upadhyay et al. .............. 60/285 |
| 7,779,680 B2 | 8/2010 | Sasaki et al. | |
| 8,397,489 B2 * | 3/2013 | Webb et al. ..................... 60/285 |
| 2005/0005596 A1 * | 1/2005 | Xu et al. .......................... 60/286 |
| 2006/0086080 A1 * | 4/2006 | Katogi et al. ................... 60/278 |
| 2006/0162689 A1 * | 7/2006 | Winkelman et al. .......... 123/299 |
| 2007/0245714 A1 * | 10/2007 | Frazier et al. ................... 60/276 |

(Continued)

FOREIGN PATENT DOCUMENTS

| | | | |
|---|---|---|---|
| JP | 2010209789 A | * | 9/2010 |
| JP | 2012092798 A | * | 5/2012 |
| WO | 2010065963 A2 | | 6/2010 |

*Primary Examiner* — Stephen K Cronin
*Assistant Examiner* — Joseph Dallo
(74) *Attorney, Agent, or Firm* — Julia Voutyras; Alleman Hall McCoy Russell & Tuttle LLP

(57) ABSTRACT

A method for controlling combustion in an engine is provided. The method comprises under a first condition, adjusting an EGR amount of a total cylinder charge in response to engine out NOx levels being below a first threshold. In this way, NOx levels may be used as feedback to control combustion stability.

19 Claims, 4 Drawing Sheets

(56) References Cited

U.S. PATENT DOCUMENTS

| | | | |
|---|---|---|---|
| 2007/0246028 A1* | 10/2007 | Fujita et al. | 123/568.12 |
| 2008/0202118 A1 | 8/2008 | Ide et al. | |
| 2008/0264036 A1* | 10/2008 | Bellovary | 60/274 |
| 2009/0063023 A1* | 3/2009 | Nagae | 701/108 |
| 2009/0158710 A1* | 6/2009 | Suzuki | 60/285 |
| 2009/0250041 A1* | 10/2009 | Minami | 123/568.12 |
| 2010/0018483 A1* | 1/2010 | He et al. | 123/90.15 |
| 2010/0051001 A1 | 3/2010 | Webb et al. | |
| 2010/0058738 A1* | 3/2010 | Webb et al. | 60/285 |
| 2010/0095933 A1* | 4/2010 | Moriya et al. | 123/435 |
| 2010/0139249 A1* | 6/2010 | Alm et al. | 60/285 |
| 2010/0251698 A1* | 10/2010 | Hiranuma et al. | 60/278 |
| 2011/0162350 A1 | 7/2011 | Ponnathpur | |
| 2011/0239997 A1* | 10/2011 | Surnilla et al. | 123/568.21 |
| 2011/0283678 A1* | 11/2011 | Zanetti et al. | 60/274 |
| 2011/0289918 A1* | 12/2011 | Wada | 60/605.2 |
| 2013/0014575 A1* | 1/2013 | Levijoki et al. | 73/114.75 |
| 2013/0047607 A1* | 2/2013 | Petrovic et al. | 60/605.2 |
| 2013/0118162 A1* | 5/2013 | Hepburn et al. | 60/602 |
| 2013/0174816 A1* | 7/2013 | Riley et al. | 123/568.11 |
| 2013/0284145 A1* | 10/2013 | Surnilla et al. | 123/25 C |

* cited by examiner

NOX FEEDBACK FOR COMBUSTION CONTROL

FIELD

The present disclosure relates to combustion in an internal combustion engine.

BACKGROUND AND SUMMARY

A variety of emissions, such as nitrogen oxides (e.g., NO and $NO_2$), are emitted in exhaust gases of internal combustion engines. In order to decrease emissions from motor vehicles, emissions are regulated via use of exhaust system components, such as catalytic converters. Additionally, various gas sensors, including NOx sensors, are employed to detect the emissions in exhaust gases.

Minimizing engine out emissions involves a balance of oxidizing and reducing exhaust constituents such as carbon monoxide (CO), soot, unburnt hydrocarbons (HC), and NOx. Diesel engines with compression ignition operate under lean air-fuel ratios most often, and therefore can have high levels of NOx production compared to gasoline engines. To reduce the production of NOx, exhaust gas recirculation (EGR) systems may be utilized to divert a portion of the exhaust gas back to the intake, thereby reducing peak combustion temperatures and pressures so as to lower NOx.

However, under these conditions, soot or other particulate matter production can increase. Additionally, due to the lowered oxygen concentration in the cylinder charge when EGR is present, under certain conditions, combustion may become unstable e.g., knocking and/or misfiring may occur, which can degrade the engine and lead to reduced fuel economy.

The inventors have recognized the above issues and offer a method to at least partly address them. In one embodiment, a method for controlling combustion in an engine comprises under a first condition, adjusting an EGR amount of a total cylinder charge in response to engine out NOx levels being below a first threshold.

In this way, engine out NOx levels may be used as feedback to control combustion stability. In one example, if NOx levels decrease below a threshold level, it may indicate a degraded combustion condition, for example, due to a higher than optimal EGR percentage of the cylinder charge. To compensate, the EGR percentage may be decreased by adjusting an EGR valve.

The present disclosure may offer several advantages. In one embodiment, by detecting degraded combustion via NOx feedback, conditions that reduce fuel economy and increase soot production may be detected, and a delivered EGR amount may be adjusted to compensate. Thus, fuel economy may be improved, and soot emissions may be reduced. Further, NOx levels may be maintained within a desired window such that if NOx levels are too high, additional EGR may be provided to lower NOx emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
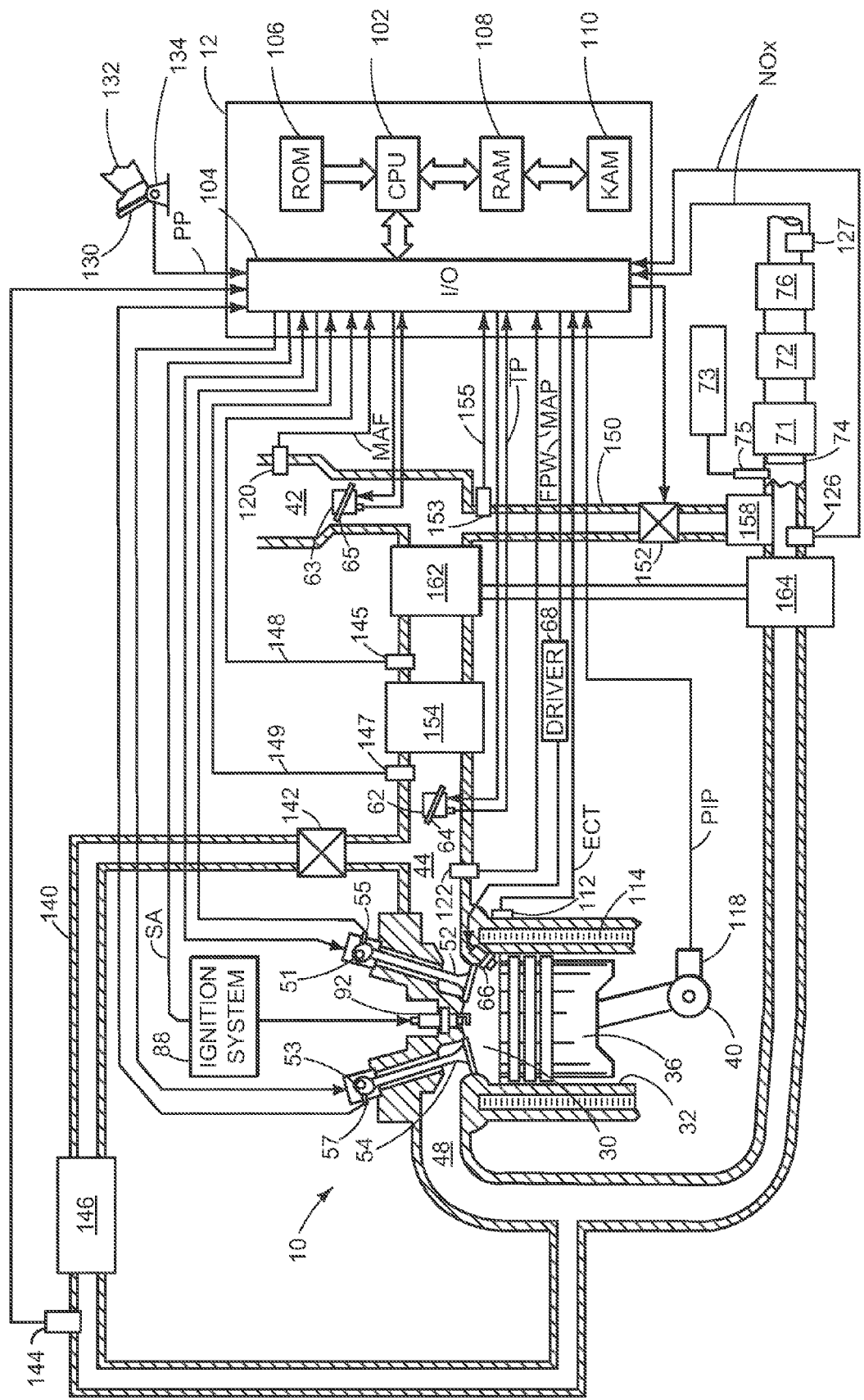
FIG. 1 shows a schematic diagram of an embodiment of an engine with a turbocharger and an exhaust gas recirculation system.
Figure 2:
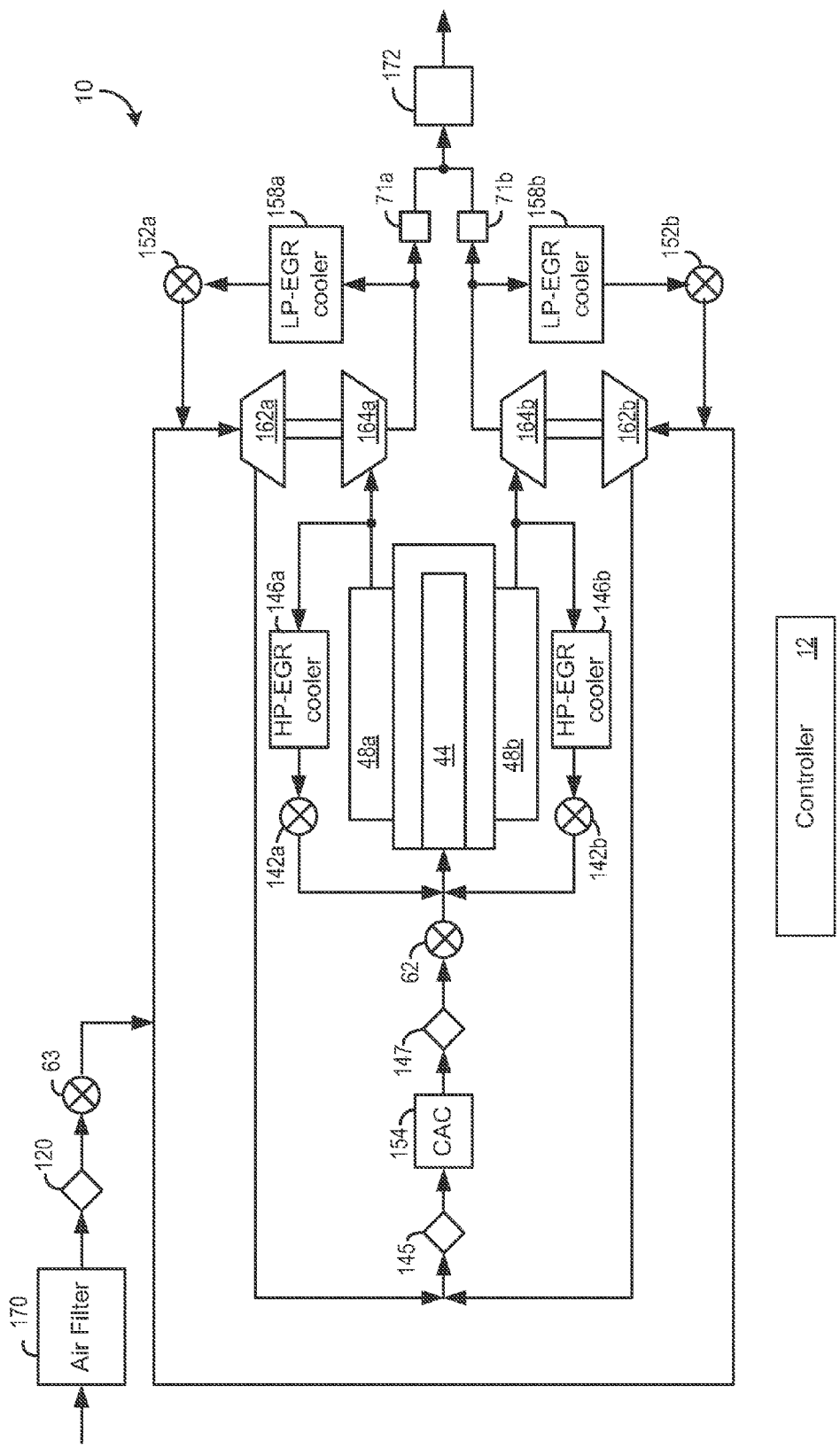
FIG. 2 shows a schematic diagram of an embodiment of an engine with dual cylinder banks, the engine including an exhaust gas recirculation system.
Figure 3A:
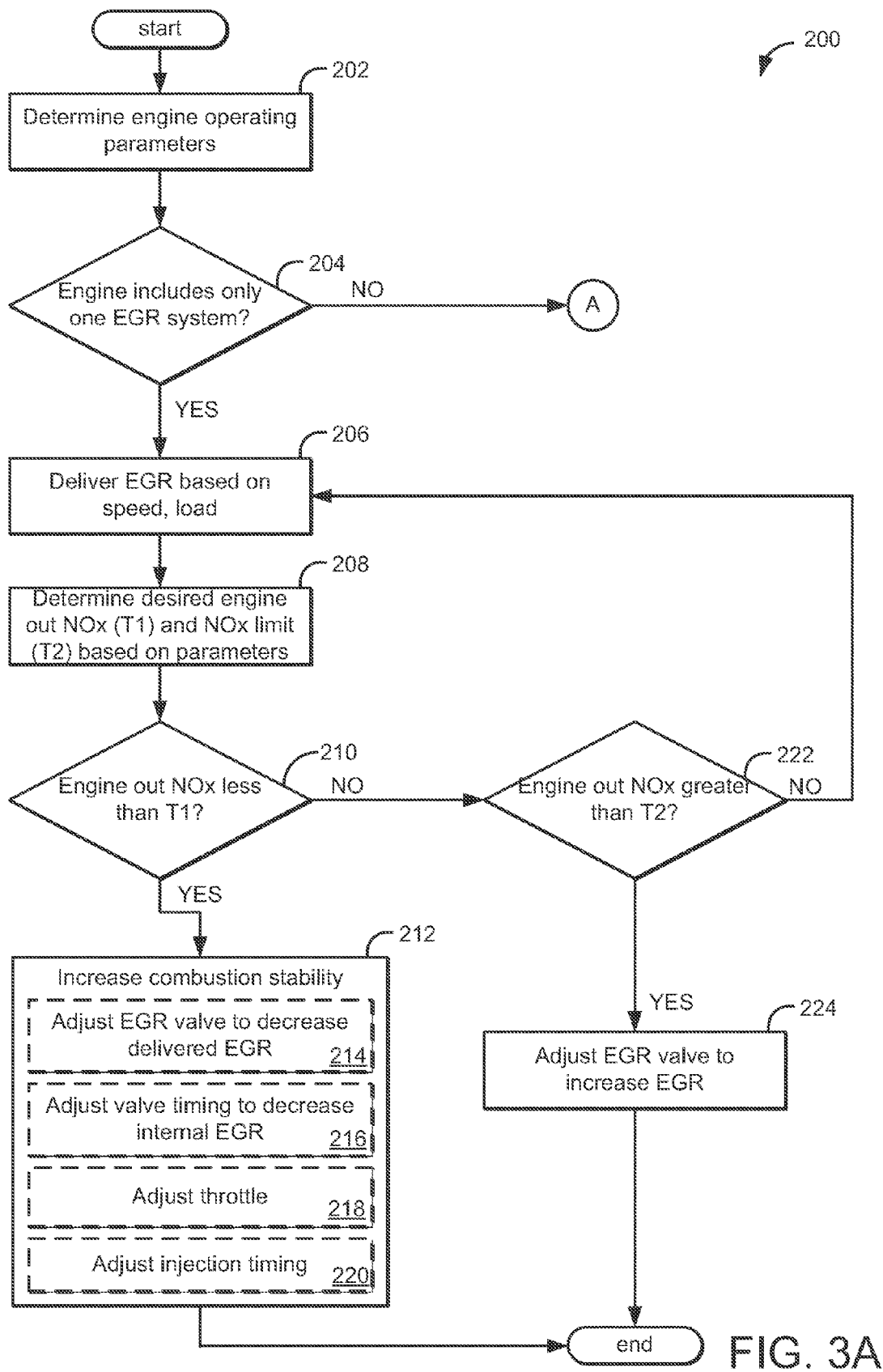
FIGS. 3A and 3B show a flow chart illustrating a method for controlling combustion according to an embodiment of the present disclosure.
Figure 3B:
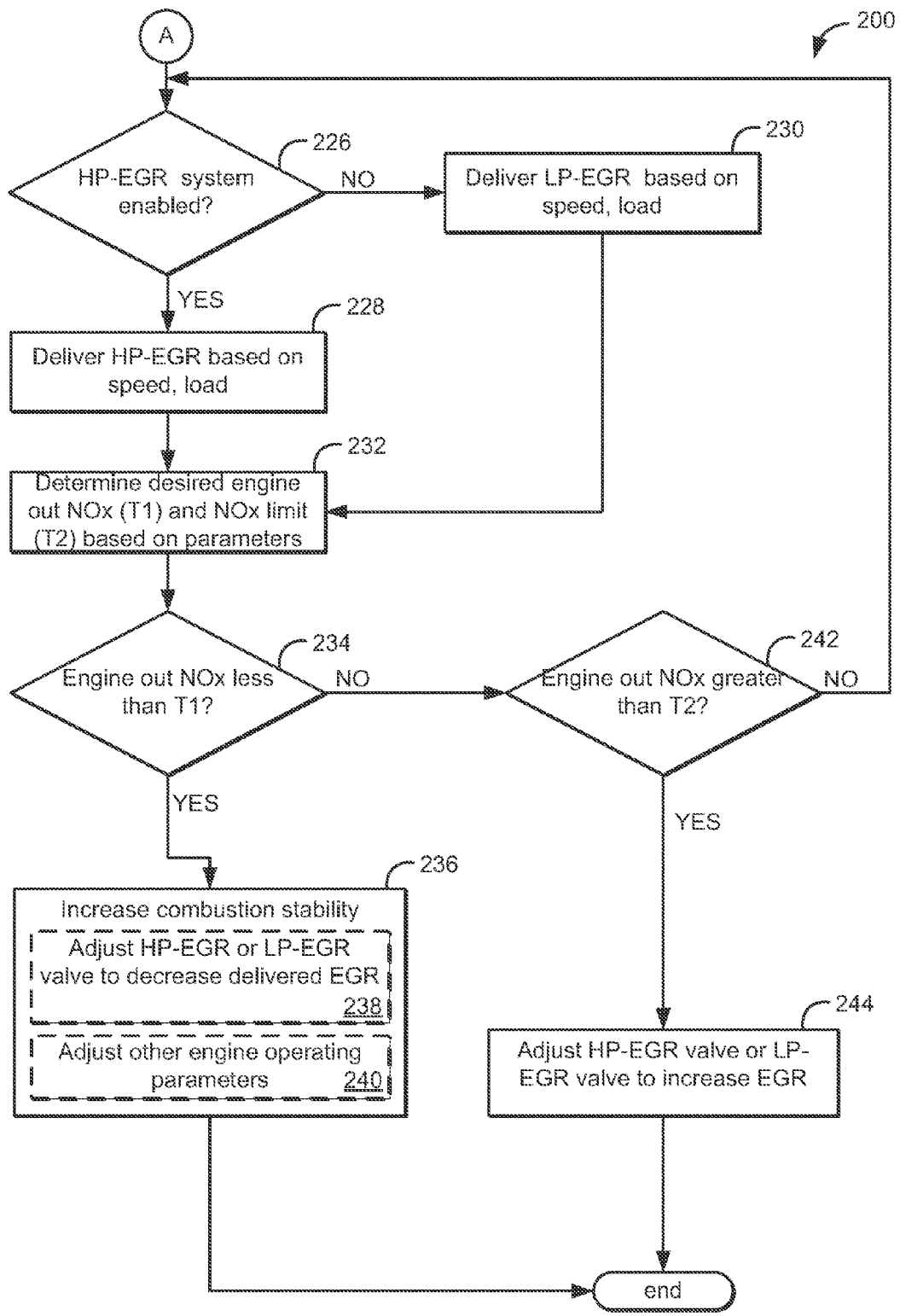

A variety of inputs may be used when determining a desired amount of EGR delivered to the cylinders, such as engine speed, engine load, air/fuel ratio, etc. In embodiments disclosed herein, engine out NOx levels may be used as feedback to maintain EGR delivery within a desired window to balance NOx reduction with HC and soot production. FIGS. 1 and 2 depict example engines including an EGR system, NOx sensor, and control system. The control system may be configured to carry out one or more control routines in order to deliver a desired amount of EGR, one example of which is illustrated in FIGS. 3A and 3B.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside combustion chamber 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may open and close according to lobes of intake cam 51. Similarly, exhaust valve 54 may open and close according to lobes of exhaust cam 53. Phase of intake cam 51 and exhaust cam 53 may be varied with respect to crankshaft 40. Alternatively, the variable valve actuator may be electro hydraulic or any other conceivable mechanism to enable valve actuation. During some conditions, controller 12 may vary the signals provided to actuators coupled to intake cam 51 and exhaust cam 53 to control the opening and closing timing of the respective intake and exhaust valves. The position of intake valve 52 and exhaust valve 54 may be determined by valve position sensors 55 and 57, respectively. In alternative embodiments, one or more of the intake and exhaust valves may be actuated by one or more electrical actuators, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30, for example in order to control NOx production. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor. In one embodiment, the exhaust gas sensor 126 may be a NOx sensor configured to provide an indication of engine out NOx levels, e.g., NOx levels in the exhaust downstream of the engine and upstream of any emission control devices.

Emission control devices 71, 72, and 76 are shown arranged along exhaust passage 48 downstream of exhaust gas sensor 126. In the depicted embodiment, device 71 may be a selective catalytic reduction (SCR) system, while devices 72 and 76 may be a diesel oxidation catalyst (DOC), diesel particulate filter (DPF), three way catalyst (TWC), $NO_X$ trap, various other emission control devices, or combinations thereof. For example, device 72 may be a DOC and device 76 may be a DPF. In some embodiments, DPF 76 may be located downstream of SCR 71 and DOC 72 (as shown in FIG. 1), while in other embodiments, DPF 76 may be positioned upstream of DOC 72. Alternative arrangements are also possible in some embodiments, such as DOC 72 and/or DPF 76 being arranged upstream of SCR 71. If device 71 is an SCR system, a reductant tank 73 may be present to store reductant, such as urea or $NH_3$. The tank 73 may be coupled to an injector 75 to inject reductant into the exhaust upstream of the device 71 or into the device 71 in order to reduce NOx in the device 71. Further, a mixer 74 may be provided to ensure adequate mixing of the reductant within the exhaust stream. Urea may be injected in proportion to an amount of engine feedgas NOx entering the SCR. An additional NOx sensor 127 may be present downstream of the devices 71, 72 and 76 to provide an indication of the efficiency of the devices, by comparing the downstream NOx reading from sensor 127 to the upstream NOx reading from sensor 126.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc. In FIG. 2, an example of an engine system including a plurality of cylinder banks and an exhaust gas recirculation system is illustrated. In one embodiment, engine 10 may comprise a turbocharger including compressor 162 and turbine 164, throttle 63 upstream of compressor 162, and a low-pressure exhaust gas recirculation (LP-EGR) system. The LP-EGR system may route EGR from downstream of turbine 164 to upstream of compressor 162 and downstream of throttle 63. The engine system may further comprise a HP-EGR system which routes EGR from upstream of turbine 164 to downstream of throttle 62.

Turning to FIG. 2, air may enter engine 10 through an air filter 170. Air filter 170 may be configured to remove solid particulates from the air so a clean air mass may enter engine 10. The clean air mass flow may be measured as it flows past mass air flow sensor 120 and then through intake throttle 63. The clean air mass flow measured by mass air flow sensor 120 may be communicated to controller 12. In one embodiment, the clean air mass may be split between the different cylinder banks of engine 10 downstream of intake throttle 63 and upstream of turbocharger compressor 162. An EGR system may inject exhaust gas upstream of turbocharger compressor 162 so that a combination of clean air and exhaust gas can be compressed by turbocharger compressor 162. In one embodiment, turbocharger compressor 162 may include a first compressor 162a for a first cylinder bank and a second compressor 162b for a second cylinder bank.

The compressed combination of clean air and exhaust gas downstream of turbocharger compressor 162 may be cooled by a charge air cooler (CAC) 154 upstream of a second throttle 62. In one embodiment, the oxygen content of the airflow downstream from turbocharger compressor 162 may be measured by a sensor 145 upstream of CAC 154. In an alternate embodiment, the oxygen content of the airflow downstream from turbocharger compressor 162 may be measured by a sensor 147 downstream of CAC 154. Measurements from sensors 145 and/or 147 may be communicated to controller 12.

In one embodiment, high pressure exhaust gas may be combined with the compressed combination of clean air and exhaust gas downstream of throttle 62 and upstream of intake manifold 44. The combination of gases may be routed to one or more cylinder banks by intake manifold 44. After combustion in the cylinders, exhaust gas may be routed through exhaust passage 48. In one embodiment, exhaust passage 48 includes an exhaust manifold for each bank of cylinders, such as exhaust manifold 48a for a first cylinder bank and exhaust manifold 48b for a second cylinder bank.

At least a portion of the exhaust gasses may drive a turbine 164 of the turbocharger. In one embodiment, turbine 164 may include a first turbine 164a for a first cylinder bank and a second turbine 164b for a second cylinder bank. In one embodiment, at least a portion of the exhaust gasses may be routed through an HP-EGR system. For example, an HP-EGR system may include HP-EGR cooler 146 and valve 142 for routing cooled exhaust gasses upstream of intake manifold 44. In one embodiment, a HP-EGR system may include a first HP-EGR cooler 146a and valve 142a for a first cylinder bank and a second HP-EGR cooler 146b and valve 142b for a second cylinder bank.

Downstream from turbine 164, at least a portion of the exhaust gasses may flow downstream through emission control device 71 and muffler 172. In one embodiment, emission control device 71 may include a first light-off catalyst 71a for a first cylinder bank and a second light-off catalyst 71b for a second cylinder bank. Muffler 172 may be configured to dampen exhaust noise from engine 10.

At least a portion of the exhaust gasses from downstream of turbine 164 may be routed upstream of turbocharger compressor 162 by an LP-EGR system. For example, an LP-EGR system may include LP-EGR cooler 158 and valve 152 for routing cooled exhaust gasses upstream of compressor 162. In one embodiment, an LP-EGR system may include a first LP-EGR cooler 158a and valve 152a for a first cylinder bank and a second LP-EGR cooler 158b and valve 152b for a second cylinder bank.

Thus, the systems depicted in FIGS. 1 and 2 may provide for both an HP-EGR and LP-EGR system. Under certain conditions, it may be advantageous to deliver EGR exclusively from the HP-EGR system, while under other conditions it may be advantageous to deliver EGR exclusively from the LP-EGR system. In some embodiments disclosed herein, operation of the HP-EGR and LP-EGR systems may be controlled based on engine-out NOx levels to control NOx production, provide combustion stability, and/or reduce soot production and improve fuel economy.

FIGS. 3A and 3B illustrate a method 200 for adjusting EGR in response to NOx levels in an exhaust stream. Method 200 may be carried out by a control system of a vehicle, such as controller 12, in response to feedback from one or more engine sensors, such as a NOx sensor. Method 200 comprises, at 202, determining engine operating parameters. Engine operating parameters may include engine speed, engine load, MAP, engine temperature, and engine out NOx levels, as well as other parameters. The engine operating parameters may be determined from signals received from a variety of sensors, such as sensors 112, 120, 126, etc. At 204, method 200 comprises determining if the engine operating parameters indicate only one EGR system is present. If the engine operating conditions indicate multiple EGR systems are present, for example if LP-EGR and HP-EGR systems are present, method 200 proceeds to 226, which will explained below with respect to FIG. 3B.

If the parameters indicate that only one EGR system is present, method 200 proceeds to 206 to deliver EGR to the cylinders based on engine speed and load. The control system may include a map that includes a predetermined EGR amount that is to be delivered to the cylinders at each speed and load point of the engine, and the delivered EGR amount may be based on the map. Further, under certain conditions, such as during an engine cold start, or when the engine is operated under wide open throttle, EGR may be disabled.

At 208, desired engine out NOx (threshold 1, T1) and NOx limit (threshold 2, T2) are determined based on the engine operating parameters. T1 and T2 may be any suitable NOx amounts that indicate combustion instability (for T1), and a NOx level that is too high to be adequately converted by one or more emission control devices in the exhaust (for T2). The NOx levels between T1 and T2 comprise a desired NOx level window, where NOx levels are low enough to be adequately converted by the emission control devices, but not so low that they indicate a cylinder charge that is too lean or lacking in oxygen to produce stable combustion. In some embodiments, T1 and T2 may be fixed and do not change regardless of operating conditions, while in other embodiments, T1 and/or T2 may vary based on engine operating conditions, such as speed and load, for example. In one non-limiting example, T1 may be 50 ppm, while T2 may be 200 ppm.

At 210, it is determined if engine out NOx levels are less than T1. If NOx levels are lower than T1, it may indicate an unstable combustion condition wherein HC and soot production increase, and fuel economy is reduced. As such, if it is determined NOx levels are lower than T1, method 200 proceeds to 212 to increase combustion stability.

Increasing combustion stability may include one or more actions, performed individually or in combination, to adjust cylinder charge conditions to lower HC and soot production without greatly increasing NOx. Increasing combustion stability may include adjusting an EGR valve to decrease delivered EGR at 214. The amount of EGR initially delivered to the cylinders may be a set percentage mass of total cylinder charge (e.g., 25%) based on engine speed and load. To reduce EGR, an EGR valve may be adjusted such that the percent EGR of total cylinder charge is reduced, for example to 10%. By reducing EGR, combustion stability may increase and combustion temperatures may increase, increasing NOx production while lowering HC and soot production. By continuing to deliver some EGR, NOx production may be kept within the desired window. In some embodiments, the EGR valve may be fully closed to disable EGR delivery.

However, under some conditions, the delivered EGR amount may not be adjusted, even though reducing the EGR amount would increase combustion stability. Under these conditions, the increase in NOx produced as a result of decreasing the EGR amount may be undesirable, and may result in NOx emissions exceeding a desired amount. For example, if the vehicle includes a selective catalytic reduction (SCR) system, it may rely on the injection of a reductant such as urea into the exhaust in order to convert the NOx. If the amount of urea available for injection is low, increasing engine out NOx may result in additional NOx that the SCR system in unable to convert. Similarly, if the efficiency of the SCR or another emissions control device is determined to be low, increasing the engine out NOx may result in excessive, undesirable amounts of NOx emissions to the atmosphere. Catalyst or SCR efficiency may be determined via sensing NOx upstream and downstream of the catalyst or SCR and determining a ratio of NOx reduction across the catalyst or SCR. Further, in conditions where high load is anticipated, such as during idle where it is expected the vehicle is going to be subsequently operated at a higher load, it may undesirable to reduce EGR. Under the conditions described, combustion stability may be provided by altering other engine operating parameters described below.

Increasing the combustion stability may also include adjusting valve timing to decrease internal EGR at 216. The cam timing may be adjusted through the variable cam timing (VCT) system such that the internal EGR (e.g., residual fraction) is lowered. For example, cam timing may be adjusted to decrease valve overlap so that there is less internal EGR, and therefore decreased residual gases in the combustion chamber, in order to maintain combustion stability.

At 218, increasing combustion stability may include adjusting the throttle. By adjusting the throttle, a desired amount of fresh air may be admitted to the cylinders to increase the oxygen content of the cylinder charge. As such, the throttle may be opened as the EGR valve is closed. Additionally, fuel injection timing may be adjusted at 220 to improve combustion stability. For example, fuel injection may be advanced to allow additional time for combustion, which may improve combustion and lower the release of unburnt hydrocarbons. In another example, fuel injection may be split such that it is injected a first time early in the intake stroke and injected a second time late in the intake stroke. As such, the fuel mixture in the combustion chamber may be more homogenous, resulting in more stable combustion.

The adjustments to the engine operating parameters in order to increase combustion stability at 212 may result in an increase in engine out NOx levels. The operating parameters, such as EGR amount and injection timing, may be adjusted to increase NOx above the first threshold T1, while keeping it below the NOx limit threshold T2. However, within the window between T1 and T2, the degree to which the NOx levels are increased may be modulated based on or more parameters. For example, in some embodiments, if the amount of urea available for injection in the SCR system is high, or if the efficiency of the SCR system or other emissions control devices are determined to be high, the NOx levels increased by adjusting the EGR amount, injection timing, etc., may be increased by a larger amount than when the urea availability is lower, or when catalyst efficiency is not as high. By doing so, NOx may increased to levels that may still be converted by the emissions control devices, while maximizing the reduction in HC and soot provided by the decreased EGR or adjusted injection timing. After increasing combustion stability, method 200 ends.

If it is determined at 210 that engine out NOx is not lower than T1, method 200 proceeds to 222 to determine if engine out NOx is greater than T2. If engine out NOx is not greater than T2, the NOx levels are within the desired window, and as such method 200 proceeds back to 206 to continue to deliver EGR based on speed and load. If NOx levels are above T2, NOx production is higher than desired, and may result in undesirably high NOx emissions and/or place an excessive burden on the emission control devices. Thus, at 224, method 200 includes adjusting the EGR valve to increase the EGR delivered to the cylinders. By increasing the EGR, combustion temperatures may be lowered, and as a result, NOx production decreased. Adjusting the EGR valve may include opening the EGR valve to admit more EGR to the cylinders. Additionally, other engine operating parameters may be adjusted to compensate for the increased EGR, such as adjusting the throttle, fuel injection timing, etc. After adjusting the EGR valve, method 200 ends.

Returning to 204, if the engine operating parameters indicate more than one EGR system is present, method 200 proceeds to 226 of FIG. 3B. At 226, it is determined if an HP-EGR system is enabled. In embodiments where both an HP-EGR system and an LP-EGR system are present, under certain conditions, the HP-EGR system may be operated, while under other conditions, the LP-EGR system may be operated. For example, in low engine load conditions, only the HP-EGR system may be operated to avoid diverting air through the LP-EGR system. Under high load conditions, only the LP-EGR system may be operated, as it may be difficult to provide adequate flow through the HP-EGR system under high load conditions. Whether HP-EGR or LP-EGR is operated may depend on various operating parameters, such as engine speed, load, manifold absolute pressure, transient vs. steady state conditions, etc. If the answer at 226 is yes, method 200 proceeds to 228 to deliver HP-EGR based on speed and load. If the answer at 226 is no, method 200 proceeds to 230 to deliver LP-EGR based on speed and load. Similar to 206 described with respect to FIG. 3A, the EGR amount delivered to the cylinders (whether HP or LP) may be based on a speed-load map stored in the memory of the control system. After determining the HP-EGR amount at 228 or the LP-EGR amount at 230, method 200 proceeds to 232.

At 232, the desired engine out NOx window defined by T1 and T2 is determined based on engine operating parameters, as described with respect to 208. At 234, it is determined if engine out NOx is less than T1. If yes, method 200 proceeds to 236 to increase combustion stability. Similar to 212, increasing combustion stability may include one or more actions, such as decreasing the total EGR amount. The total EGR amount may be decreased by adjusting the HP-EGR or LP-EGR valve, depending on whether the engine is operating with HP- or LP-EGR, at 238 to decrease the delivered EGR amount.

Similar to increasing the combustion stability as described for 212 of FIG. 3A, under some conditions, the delivered HP-EGR or LP-EGR amount may not be adjusted. These conditions include the amount of urea available for injection being low, the efficiency of the SCR or another emissions control device being low, and in conditions where high load is anticipated.

In addition to adjusting the HP-EGR or LP-EGR conditions, increasing the combustion stability may include adjusting other engine operating parameters at 240, such as throttle and injection timing, as explained with respect to 212 of FIG. 3A. Upon increasing the combustion stability, method 200 ends.

If it is determined at 234 that engine out NOx is not lower than T1, method 200 proceeds to 242 to determine if engine out NOx is greater than T2. If engine out NOx is not greater than T2, the NOx levels are within the desired window, and as such method 200 proceeds back to 226 to continue to deliver HP-EGR or LP-EGR based on speed and load. If engine out NOx is greater than T2, at 244, method 200 includes adjusting the HP-EGR or LP-EGR valve to increase the EGR amount delivered to the cylinders. By increasing the EGR, combustion temperatures may be lowered, and as a result, NOx production decreased. Adjusting the EGR valves may include opening the EGR valves to admit more EGR to the cylinders. Additionally, other engine operating parameters may be adjusted to compensate for the increased EGR, such as adjusting the throttle, fuel injection timing, etc. Additionally, the degree to which the HP-EGR or LP-EGR amount is increased may be adjusted based on operating conditions. For example, in some embodiments, if the amount of urea available for injection in the SCR system is high, or if the efficiency of the SCR system or other emissions control devices are determined to be high, the NOx levels increased by adjusting the HP- or LP-EGR amount, injection timing, etc., may be increased by a larger amount than when the urea availability is lower, or when catalyst efficiency is not as high. After adjusting the EGR valve, method 200 ends.

Thus, method 200 provides for adjusting one or more engine operating parameters, such as the EGR percent of total cylinder charge, in response to feedback from a NOx sensor downstream of the engine. In doing so, NOx levels may be maintained within a desired window and thus ensure combustion stability, reduced HC, soot, CO production, and maintain desired fuel economy. In some embodiments, the EGR amount provided to the cylinders may be adjusted according to feedback from a NOx sensor upstream of an emission control device as well as a sensor downstream of the device, such as sensors 126 and 127. The EGR may be decreased if NOx levels determined by the upstream sensor are below a threshold (T1), and the EGR may be increased if the downstream sensor indicates NOx levels are above a threshold (T2). Further, the efficiency of the emission control device may be determined by a ratio of the two sensors, and the EGR may be adjusted according to the ratio. For example, if the ratio is below a threshold (e.g., if the difference between the sensor outputs is small) it may indicate an inefficient catalyst. As such, even if the upstream sensor indicates NOx levels are below T1, EGR may not be decreased due to catalyst inefficiency. If the catalyst efficiency is determined to be low based on the upstream and downstream sensor readings, in some embodiments, EGR may be increased to reduce NOx to levels that may be converted by the catalyst.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling combustion in an engine, comprising:
    under a first condition, decreasing an EGR amount of a total cylinder charge in response to engine out NOx levels being below a first threshold and increasing the EGR amount of the total cylinder charge in response to the engine out NOx levels being above a second threshold, the first threshold being lower than the second threshold; and
    under a second condition, maintaining the EGR amount of the total cylinder charge even when NOx levels are below the first threshold.

2. The method of claim 1, wherein increasing the EGR amount of the total cylinder charge comprises adjusting an EGR valve to increase a percentage of EGR in the total cylinder charge.

3. The method of claim 1, wherein the first condition includes one or more of a reductant amount in an SCR system being above a first level and an efficiency of one or more emission control devices being above an efficiency threshold, and wherein the second condition includes one or more of the reductant amount being below the first level and the efficiency of the one or more emission control devices being below the efficiency threshold.

4. The method of claim 1, wherein decreasing the EGR amount of the total cylinder charge further comprises closing an EGR valve to decrease an EGR percentage of total cylinder charge.

5. The method of claim 4, further comprising opening an intake throttle concurrently with the EGR valve.

6. The method of claim 1, further comprising adjusting an EGR percentage of total cylinder charge based on engine speed and load.

7. The method of claim 1, further comprising adjusting one or more of a throttle and fuel injection timing in response to the engine out NOx levels being above the second threshold.

8. The method of claim 1, further comprising adjusting injection timing in response to the engine out NOx levels being below the first threshold.

9. A system comprising:
    an engine including at least one cylinder and an exhaust passage coupled to at least one emission control device;
    an exhaust gas recirculation (EGR) system to divert a portion of exhaust from the engine to an air intake of the engine;
    a NOx sensor arranged in the exhaust passage upstream of the at least one emission control device;
    and a controller including instructions to:
        decrease an EGR amount of a total cylinder charge in response to NOx levels in the exhaust being below a first threshold, the NOx levels determined by the NOx sensor;
        increase the EGR amount of the total cylinder charge in response to the NOx levels in the exhaust being above a second threshold, the first threshold being lower than the second threshold; and
        not decreasing the EGR amount of the total cylinder charge in response to NOx levels in the exhaust being below the first threshold when an amount of reductant for injection is low.

10. The system of claim 9, wherein the EGR system comprises a high pressure EGR system (HP-EGR) controlled by an HP-EGR valve and a low pressure EGR system (LP-EGR) controlled by an LP-EGR system.

11. The system of claim 10, wherein the controller includes instructions to decrease the EGR amount of total cylinder charge by adjusting the HP-EGR valve or the LP-EGR valve based on the NOx levels in the exhaust from the engine.

12. The system of claim 11, wherein the controller includes instructions to decrease the EGR amount of total cylinder charge by adjusting the HP-EGR valve under low load conditions, and decrease the EGR amount of total cylinder charge by adjusting the LP-EGR valve under medium to high load conditions.

13. The system of claim 9, wherein the controller includes instructions to increase the EGR amount of the total cylinder charge in response to NOx levels in the exhaust being above a second threshold, greater than the first threshold.

14. A method of reducing vehicle emissions, comprising:
    under a first condition, delivering HP-EGR to one or more cylinders of an engine;
    under a second condition, delivering LP-EGR to one or more cylinders of the engine; and
    under both the first and second conditions,
        decreasing an EGR amount of total cylinder charge in response to engine out NOx levels being below a first threshold;
        increasing the EGR amount of total cylinder charge in response to engine out NOx levels being above a second threshold, higher than the first threshold; and
        not decreasing the EGR amount of the total cylinder charge in response to NOx levels in the exhaust being below the first threshold when efficiency of an emissions control device is low.

15. The method of claim 14, wherein the first condition comprises medium to high engine load.

16. The method of claim 14, wherein the second condition comprises low engine load.

17. The method of claim 14, further comprising decreasing internal EGR when NOx levels are below the first threshold by adjusting one or more of intake and exhaust valve timing.

18. The method of claim 14, further comprising opening an intake throttle when NOx levels are below the first threshold.

19. The method of claim 14, further comprising adjusting fuel injection timing when NOx levels are below the first threshold.

* * * * *